United States Patent
Sugawara

(10) Patent No.: US 6,786,442 B2
(45) Date of Patent: Sep. 7, 2004

(54) SPINNING REEL ROTOR

(75) Inventor: Kenichi Sugawara, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/985,588

(22) Filed: Nov. 5, 2001

(65) Prior Publication Data

US 2002/0056776 A1 May 16, 2002

(30) Foreign Application Priority Data

Nov. 13, 2000 (JP) ........................................ 2000-344669
Dec. 19, 2000 (JP) ........................................ 2000-385193

(51) Int. Cl.$^7$ .............................................. A01K 89/01
(52) U.S. Cl. ........................ 242/231; 242/319; 242/311
(58) Field of Search ................................. 242/231, 232, 242/233, 907, 319, 311

(56) References Cited

U.S. PATENT DOCUMENTS

| 5,615,841 | A | * | 4/1997 | Saito ........................... 242/231 |
| 5,813,620 | A | | 9/1998 | Yamaguchi et al. |
| 5,820,051 | A | * | 10/1998 | Takeuchi et al. ............ 242/232 |
| 6,382,540 | B1 | * | 5/2002 | Takikura et al. ............ 242/231 |
| 6,457,662 | B1 | * | 10/2002 | Sato ........................... 242/247 |
| 6,572,044 | B2 | * | 6/2003 | Hitomi ........................ 242/322 |
| 6,609,670 | B2 | * | 8/2003 | Sato ........................... 242/231 |

FOREIGN PATENT DOCUMENTS

| JP | 11-206286 A | 8/1999 |
| JP | 2000-201593 A | 7/2000 |
| JP | 2001-292664 A | 10/2001 |
| JP | 2001-299160 A | 10/2001 |

* cited by examiner

Primary Examiner—Kathy Matecki
Assistant Examiner—Evan Langdon
(74) Attorney, Agent, or Firm—Shinjyu Global IP Counselors, LLP

(57) ABSTRACT

A spinning reel rotor is rotatably mounted on a reel unit of a spinning reel for winding a fishing line onto a spool. The rotor includes a rotor unit, a bail arm, and an inertia-imparting ring. The rotor unit has a cylindrical portion that is rotatably mounted on the reel unit, and first and second rotor arms that extend forward from the rear edge of the cylindrical portion. The bail arm is pivotably mounted on the front tips of both arms, and guides the fishing line onto the spool. The inertia-imparting member is a member for providing inertia and is detachably mounted on the rotor unit. The rotor is designed to be lightweight, and can be utilized in both situations where the rotational feel is a priority, and where powering efficiency is a priority.

16 Claims, 10 Drawing Sheets

SPINNING REEL ROTOR

BACKGROUND OF THE INVENTION

1. Field of the Invention

This invention generally relates to rotors. More specifically, the present invention relates to spinning-reel rotors rotatably mounted on the reel unit for winding fishing line onto the spool.

2. Background Information

A spinning reel rotor is generally comprised of a reel unit that is mounted on a fishing rod, a spool which is mounted on the front portion of the reel unit so as to be axially movable and around which a fishing line is wound, and a rotor that is rotatably mounted on the reel unit for winding the fishing line around the spool. The rotor has a cylindrical portion that is disposed along the inner margin of the spool, first and second arms that extend forward from a rear portion of the cylindrical portion, and a bail arm that is pivotably mounted on the front tip of both arms and winds the fishing line onto the spool.

Recently, this type of spinning reel rotor is made of a lightweight aluminum or magnesium alloy in order to reduce the weight.

Issues Invention is to Solve

With the aforementioned conventional rotor that is designed to be lightweight, as the rotor begins turning lightly, rotation starts at the start-up owing to the smaller inertial momentum. However, where the load acting upon the rotor is small, the rotational speed will vary easily depending on how much or little manual force is used to turn the handle. As a result, smoothness is lost, and the rotational feel is impaired. Increasing the inertia to prevent such problem increases the energy needed to operate the rotor, which degrades efficiency at the start up.

In view of the above, there exists a need for a rotor which overcomes the above mentioned problems in the prior art. This invention addresses this need in the prior art as well as other needs, which will become apparent to those skilled in the art from this disclosure.

SUMMARY OF THE INVENTION

An object of the present invention is to provide a lightweight rotor that can be selectively adjusted to a situation in which rotational feel should be maintained and a situation in which start up efficiency should be maintained.

A spinning reel rotor is rotatably mounted on a reel unit for winding a fishing line onto a spool, and comprises a rotor unit, a bail arm, and an inertia-imparting member. The reel unit has a cylindrical portion that is rotatably mounted on the reel unit, and first and second arms that extend forward from the rear edge of the cylindrical portion. The bail arm is pivotably mounted on the tips of both of the arms and guides a fishing line onto the spool. The inertia-imparting member is detachably mounted to the rotor unit.

With this spinning reel rotor, the inertia-imparting member is detachably mounted on the rotor unit. Here, in situations where rotational balance is the priority, the inertia-imparting member is mounted on the rotor unit. When this is done, the rotational balance is not likely to be impaired because the moment of inertia of the rotor increases.

Preferably, the inertia-imparting member of the rotor is ring shaped. In this case, because the inertia-imparting member is ring shaped, by disposing it around the rotational center of the rotor, the rotational balance is not likely to be impaired.

Preferably, the inertia-imparting member of inertia is detachably mounted on the cylindrical portion of said rotor unit. In this case, even if the inertia-imparting member is mounted on the rotor, it does not interfere with the operation of the rotor because it is disposed on the cylindrical portion of the rotor unit, which is disposed in the interior of the spool.

Preferably, the cylindrical portion of the rotor has an anterior wall that is rotatably mounted on the reel unit, and the inertia-imparting member is disposed on the anterior wall around the center of the cylindrical portion. In this case, because the inertia-imparting member is disposed around the center of the cylindrical portion, rotational balance will not be impaired easily even if the inertia-imparting member is mounted thereon.

Preferably, the spool has a tubular skirt portion that is disposed on the outer circumference of the cylindrical portion with a gap therebetween. The inertia-imparting member is disposed so as to close the gap, such that the fishing line is prevented from entering the gap between the cylindrical portion and the skirt portion. In this case, by making the gap between the spool and the rotor small by means of the inertia-imparting member, fishing line can be prevented from entering into the gap between the cylindrical portion and the spool, and fishing line is not easily wound around the spool shaft.

Preferably, the inertia-imparting member of the rotor is formed from a material that has a density greater than that of the reel unit. In this case, the moment of inertia can be greatly increased in a small amount of space.

Preferably, the rotor further comprises a weight made of sintered tungsten and disposed on at least one of the cylindrical portion, the first or second rotor arms, and the bail arm. The weight is used to correct the rotational balance. In this case, because the weight is made of sintered tungsten, it is less expensive compared to when simple tungsten is used. It is also both less expensive and more reliably obtainable than other heavy metals such as bismuth, molybdenum, or the like. Further, tungsten is relatively less likely to decompose, and less likely to dissolve in seawater. Moreover, tungsten can be formed into a precise shape and weight by sintering. Because of this, the rotational balance can be inexpensively and precisely corrected.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Overall Configuration

Figure 1:
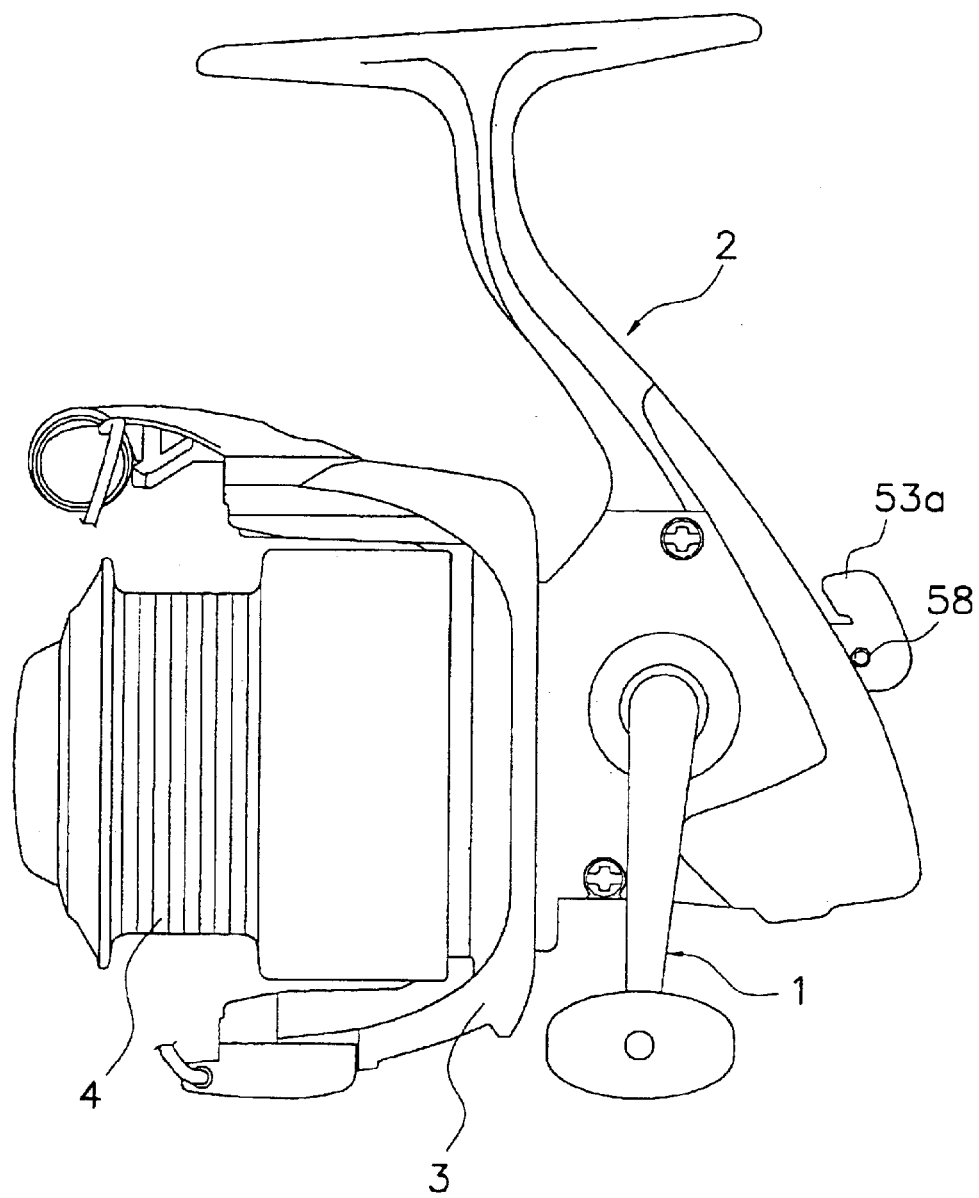
FIG. 1 is a left side view of a spinning reel in accordance with a first embodiment of the present invention.

As show in FIG. 1, a spinning reel in accordance with a first embodiment of the present invention includes a reel unit 2 that is mountable on a fishing rod, a handle assembly 1 that is rotatably mounted on the reel unit 2 so as to be rotatable on the right or left side of the reel unit, a rotor 3, and a spool 4. The rotor 3 rotates in response to the rotation of the handle assembly 1, and guides fishing line onto the spool 4. The rotor 3 is rotatably supported on the front portion of the reel unit 2 such that it rotates while moving frontward and rearward. Fishing line guided by the rotor 3 is wound around the outer circumferential surface of the spool 4, and is disposed on the front portion of the rotor 3 such that it can reciprocate frontward and rearward in the axial direction.

Configuration of the Reel Unit

Figure 3:
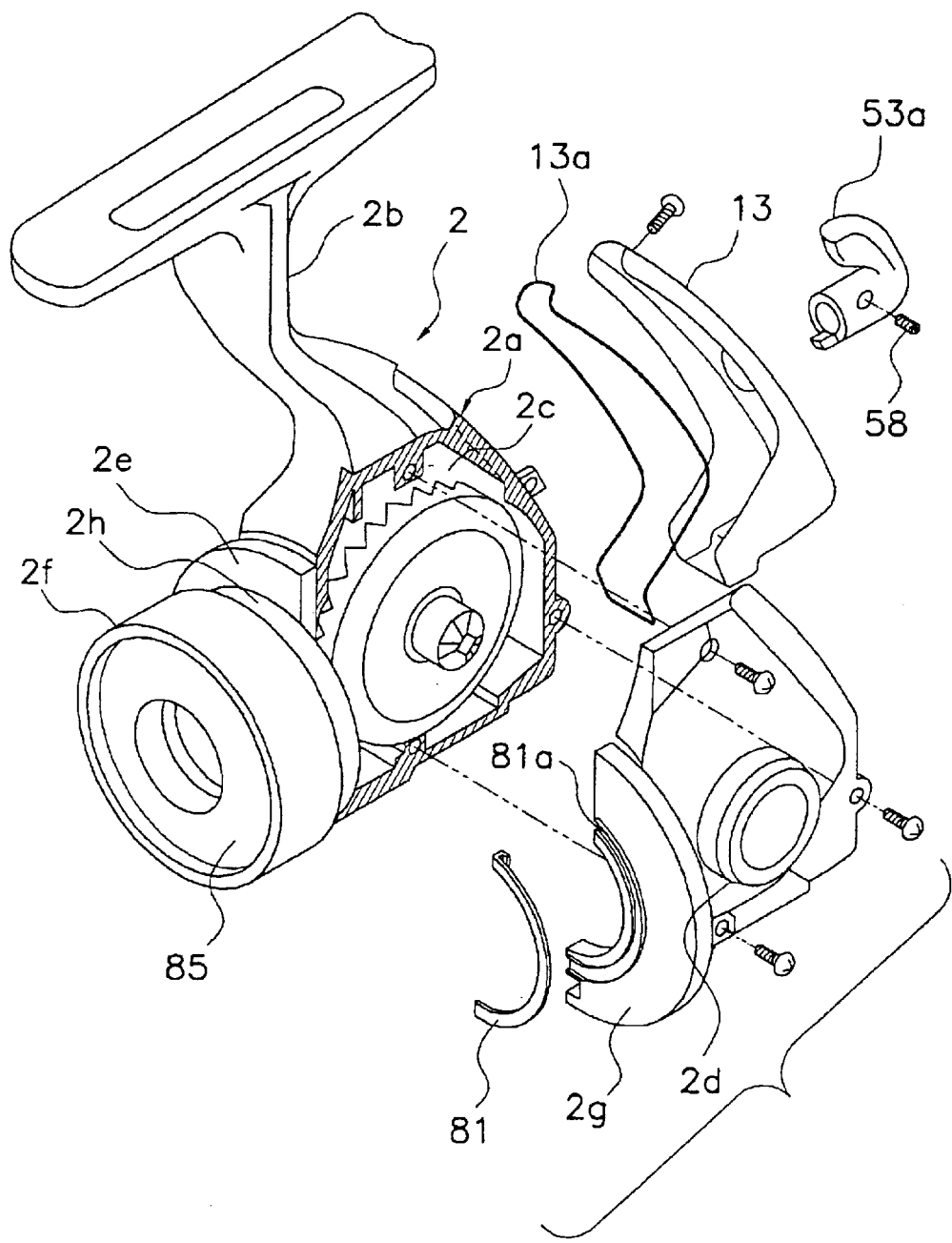
FIG. 3 is an exploded perspective of the spool and the center of the rotor in accordance with the first embodiment of the present invention.

As shown in FIG. 3, reel unit 2 has a reel body 2a that forms the main portion of reel unit 2, an opening 2c formed in the side thereof, a T-shaped rod mounting leg 2b integral with reel body 2a and extending diagonally upward and forward with respect to the reel body 2a, and a lid member 2d that is screwed into reel body 2a such that it caps opening 2c.

Figure 2:
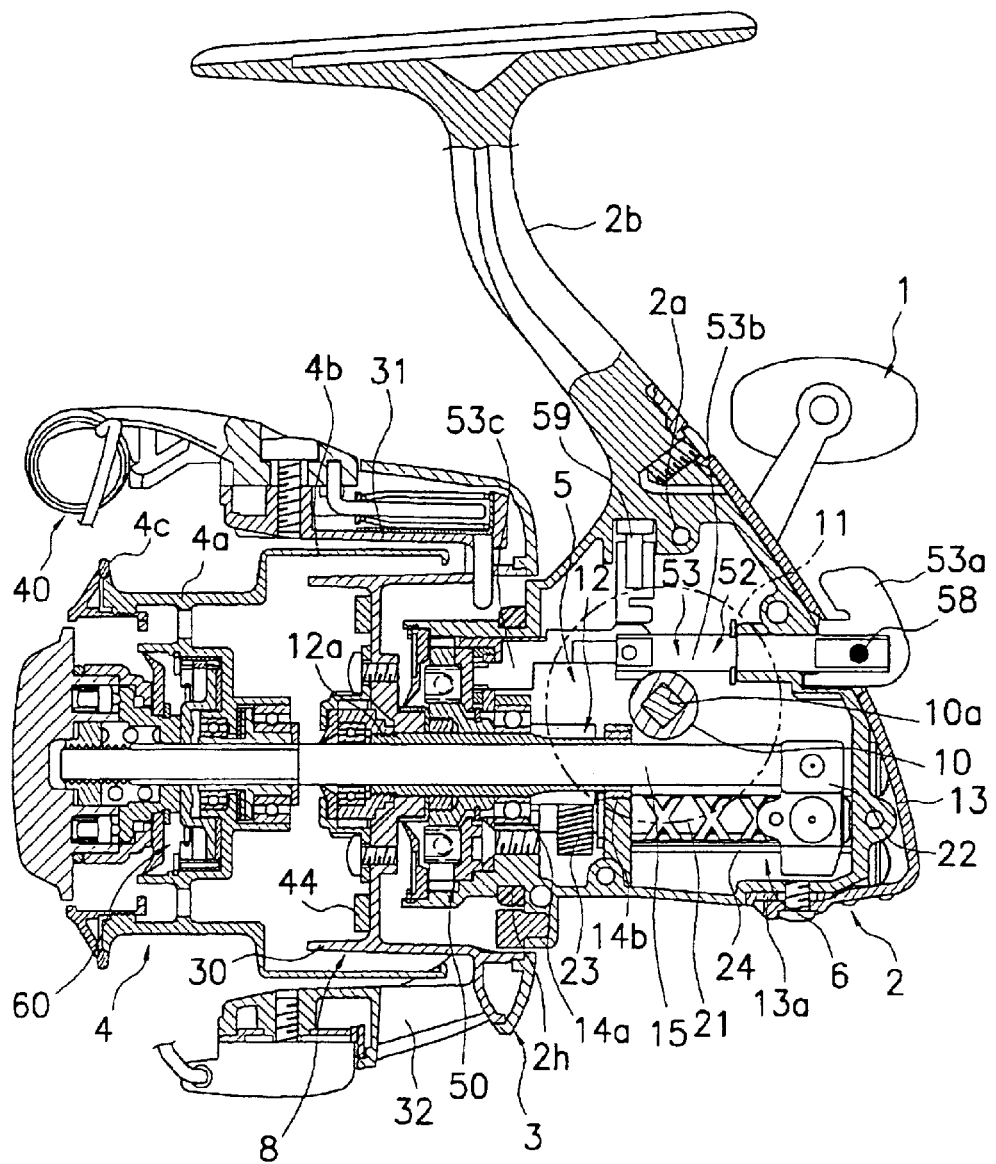
FIG. 2 is a left side cross-sectional view of the spinning reel in accordance with the first embodiment of the present invention.

Reel body 2a has a hollow space that is in communication with opening 2c for mounting a mechanism therein. As shown in FIG. 2, a rotor drive mechanism that rotates the rotor 3 in response to the rotation of the handle assembly 1 and an oscillating mechanism 6 that moves the spool 4 front and rear are provided in the hollow space, and serve to uniformly wind fishing line around the spool 4.

Figure 4:
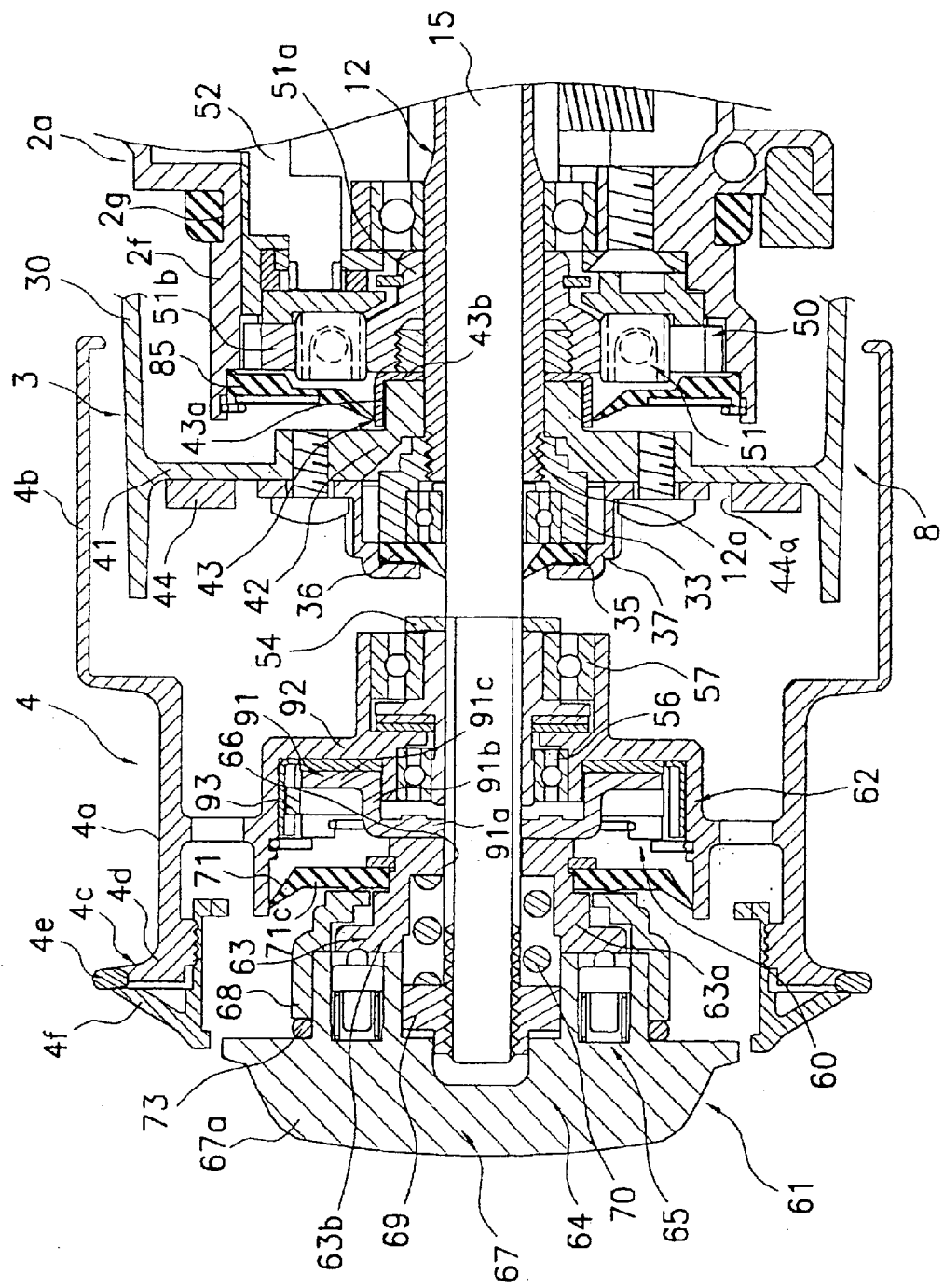
FIG. 4 is a cross-sectional view of the spool and the central portion of the rotor.

As shown in FIG. 3, a first flange 2e and a tubular member 2f that projects forward from the first flange 2e are formed on the front portion of the reel body 2a. The first flange 2e is approximately semicircular in shape, and appears as though a portion forming a chord and an arc is lacking therefrom. The first flange 2e is formed communicating with the front rim of the opening 2c. The tubular member 2f is a cylindrical member. As shown in FIG. 4, a one-way clutch 51 of a reverse rotation prevention mechanism 50 for preventing/restricting the rotation (reverse rotation) of the rotor 3 in the line casting direction is non-rotatably mounted in the tubular member 2f. A channel 2h, which is D-shaped in cross-section, and slightly smaller in diameter than the rest of the tubular member 2f, is formed in the rear end thereof. The rear surface of the channel 2h, where it attaches to the lid member 2d, communicates with and opens to opening 2c.

The lid member 2d is formed integrally with a second flange 2g on the front edge thereof, and is formed in an approximately semicircular shape that comprises the chord and arc portion that were lacking from the first flange 2e. A watershielding seal 81 made of an elastic body as mounted on the surface of the second flange 2g that contacts the first flange 2e and the rear surface of tubular portion 2f, sealing the gap between these parts. The watershielding seal 81 extends from the front surface of the second flange 2g to the rear surface thereof, continues to a position opposite the contact surface of the first flange 2e and the contact surface of the rear surface of the channel 2h, and is formed into a belt-shaped, approximately semicircular arc. The shielding seal 81 is mounted in an approximately semicircular mounting slot 81a that is formed in the front surface of second flange 2g.

As shown in FIGS. 2 and 3, the rear portion of reel unit 2 is covered with a protective cover 13 made of metal or a synthetic resin. The protective cover 13 extends from the lower portion of the reel unit 2a and the lid member 2d and the rear surfaces thereof to the rod mounting leg 2b, and is disposed such that it covers the bottom portion of the reel unit 2 and the rear surface thereof. The protective coat 13 is detachably fixed to the reel unit 2 with a screw. A spacer 13a made of a synthetic resin is interposed between the protective cover 13 and the reel unit 2. The spacer 13a is interposed therebetween in order to fill the gaps between the protective cover 13 and the reel unit 2. By interposing the spacer 13a in this manner, it can absorb variations in the gaps due to manufacturing errors, even if the protective cover 13 is made of a synthetic resin.

Configuration of the Rotor Drive Mechanism

As shown in FIG. 2, the rotor drive mechanism 5 has a master gear 11 to which the handle assembly 1 is non-rotatably mounted, and a pinion gear 12 that engages with the master gear 11.

The master gear 11 is a face gear, and is formed integrally with a master gear shaft 10. An engagement hole 10a with which the handle assembly 1 non-rotatably engages is formed in the center of the master gear shaft 10. The master gear shaft 10 is, for example, a hollow member made of stainless steel, and both ends thereof are rotatably supported via bearings by the reel body 2a and the lid member 2d.

The pinion gear 12 is a tubular member, extends from front to rear, and is rotatably mounted on reel body 2a. A front portion 12a of the pinion gear 12 passes through the center of the rotor 3, and is fixed to the rotor 3 by means of a nut 33 attached to the portion that passes through the rotor 3. The pinion gear 12 is rotatably supported by the reel body 2a via bearings 14a, 14b at the midpoint thereof in the axial direction and the rear tip thereof, respectively. The spool shaft 15 passes through the inside of the pinion gear 12. The pinion gear 12 engages with the master gear 11 and also engages with the oscillating mechanism 6.

Configuration of the Rotor

The rotor 3 has a rotor unit 8 that includes the cylindrical portion 30 fixed to the pinion gear 12 and first and second rotor arms 31, 32 that are arranged on mutually opposite sides of the cylindrical portion 30, and a bail arm 40 that is pivotably mounted to the tips of both rotor arms 31, 32 and serves to guide fishing line onto the spool 4. Both the cylindrical portion 30 of rotor unit 8 and both rotor arms 31, 32 are integrally formed, for example, from a lightweight aluminum alloy.

As shown in FIG. 4, an anterior wall 41 is formed in the front portion of cylindrical portion 30. A boss 42 that projects rearward is formed in the center of the anterior wall 41. A through hole that rotatably engages with the pinion gear 12 is formed in the center of the boss 42. The front portion 12a of the pinion gear 12 and the spool shaft 15 pass through this through hole.

Figure 5:
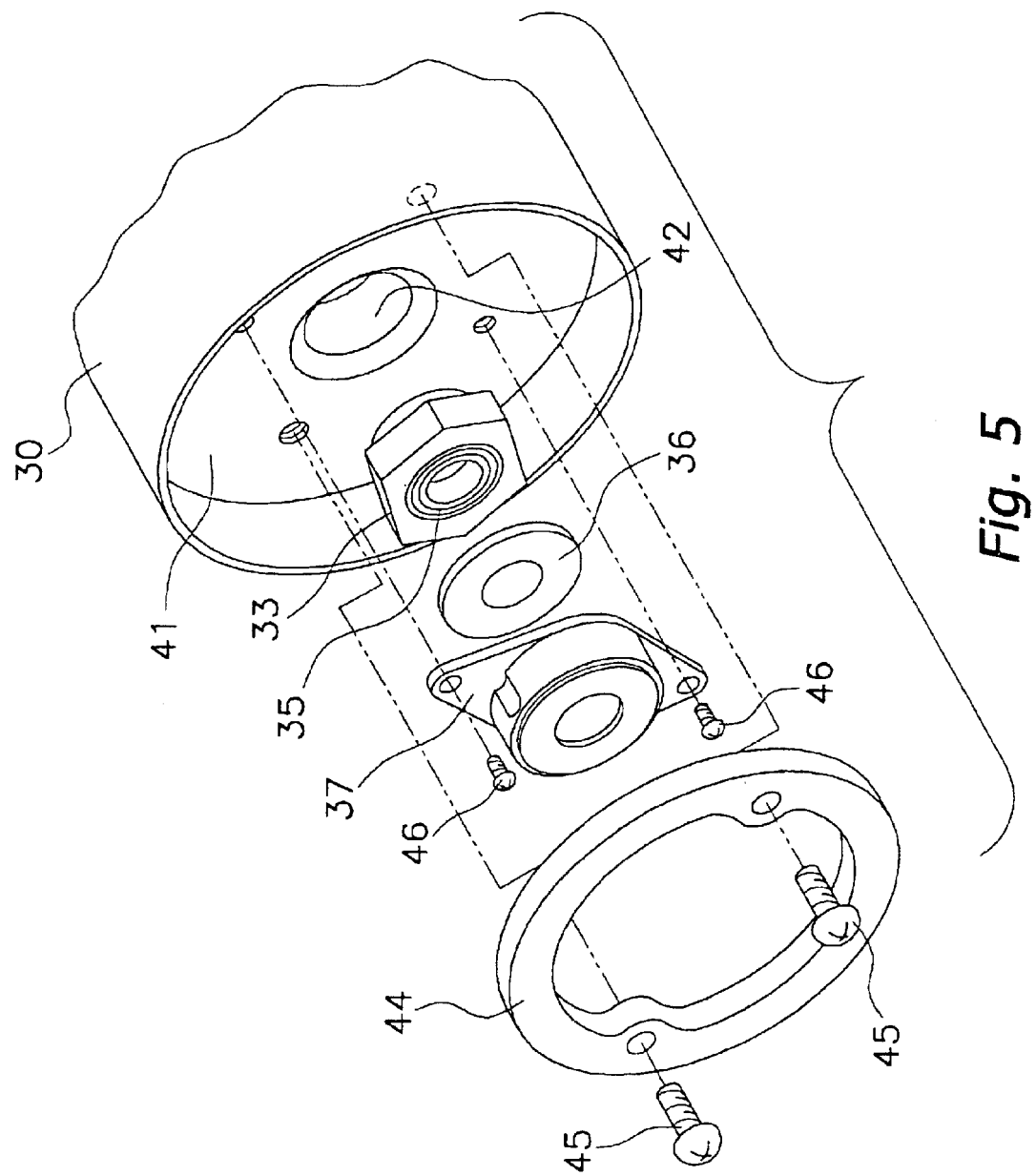
FIG. 5 is an exploded perspective view of the front portion of the rotor.

As shown in FIGS. 4 and 5, an inertia-imparting ring (an example of an inertia-imparting member) 44 is detachably mounted on the inner surface of anterior wall 41 such that there is a radial gap between the inertia-imparting ring 44 and the nut 33, and serves to impart a moment of inertia to the rotor 3. The inertia-imparting ring 44 is, for example, made of stainless steel, and has a density that is greater than the rotor 3 made of aluminum. The inertia-imparting ring 44 is established to prevent degradation in rotational feel that is attendant on lightening the rotor 3. At the same time, by detaching inertia imparting ring 44, powering efficiency is maintained. Taking the rotational balance of the rotor 3 into consideration, the inertia-imparting ring 44 is disposed around the center of the cylindrical portion 30, in other words, around the spool shaft 15. The inertia-imparting ring 44 is detachably mounted to the anterior wall 41 by means of two screws 45.

The nut 33 is screwed onto the front portion 12a of the pinion gear 12, and the rotor 3 is non-rotatably fixed to the front end of pinion gear 12 by means of this nut 33. A bearing 35 is disposed in the inner circumference of the nut 33. The bearing 35 is provided in order to maintain a gap between the spool shaft 15 and the pinion gear 12. A seal member 36 that has a lip around the outer circumference thereof is mounted on the nut 33 and a front surface of the bearing 35. The tip of the seal member 36 is in contact with the spool shaft 15. This prevents liquid from entering from the spool shaft 15 into the interior of the reel unit 2. The nut 33 is prevented from rotating by means of a retainer 37. The retainer 37 is formed into a bag shape so that it covers the nut 33 from the forward direction, and is detachably mounted to the anterior wall 41 by means of two screws 46. The retainer 37 has a star-shaped hole having twelve corners formed inside such that the retainer 37 locks the corners of the nut 33 in 30-degree phases.

The aforementioned reverse rotation prevention mechanism 50 is disposed adjacent to the boss 42. As shown in FIG. 2, the reverse rotation prevention mechanism 50 includes one-way clutch 51, and a switching mechanism 52 that switches one-way clutch 51 between a powering state (anti-reverse state) and a non-powering state (reverse-permit state).

An inner race 51a of one-way clutch 51 is non-rotatably mounted on the pinion gear 12. One-way clutch 51 is a roller type one-way clutch whose inner race is free-rotating and whose outer race 51b is non-rotatably mounted to a tubular portion 2f. As shown in FIG. 4, a gap member 43 made of a stainless steel alloy is interposed between the inner race 51a and the boss 42 of the rotor 3. The gap member 43 is a thin cylindrical member that has a tubular portion 43a and a disk portion 43b. The tubular portion 43a is inserted onto the outer circumference of the boss 42, and the disk portion 43b is sandwiched between the forward surface of the inner race 51a and the boss 42.

A shaft seal 85 having a lip thereon is mounted inside the tubular portion 2f toward the front of the one-way clutch 51. The lip around the edge of the shaft seal 85 is in contact with the outer circumferential surface of the tubular portion of the gap member 43. It is difficult for liquid to enter into the inner circumference of the gap member 43 because the disk member 43b is sandwiched between the boss 42 and the inner race 51a. Thus, if the outer circumferential surface of the gap member 43 is sealed, it will be difficult for liquid to enter into tubular portion 2f. If the shaft seal 85 is brought directly into contact with the boss 42 and the rotor 3 is then fixed to the pinion gear 12 without centering the rotor 3 correctly, the shaft seal 85 does not seal properly. Thus, by mounting the gap member 43 and centering the shaft seal 85 in advance, the sealing ability of the shaft seal 85 can be stabilized.

As shown in FIG. 2, the switching mechanism 52 has a stopper shaft 53. The stopper shaft 53 is pivotably mounted on the reel body 2a between a non-powering position and a powering position. The stopper shaft 53 has a stopper knob 53a that passes through and projects rearward from the reel body 2a and the protective cover 13 to allow operation of the stopper knob 53a, a shaft 53b that is fixed to the stopper knob 53a, and a cam 53c that is fixed to the front tip of the shaft 53b.

As shown in FIG. 3, the stopper knob 53a is detachably fixed to the shaft 53b by means of an Allen screw 58. The stopper knob 53a is detachable with respect to the shaft 53b because when removing the protective cover 13 in order to remove the lid member 2d, it is necessary to remove the stopper knob 53a. By using the Allen screw 58 to attach the stopper knob 53a, it is not necessary to seat the screw head in a hole. Also, the fishing line is unlikely to be snagged on the screw 58, because there is no screw head.

The cam 53c is urged between the non-powering state and the powering state by means of a toggle spring mechanism 59. The tip of the cam 53c engages with one-way clutch 51, and is constructed such that the one-way clutch 51 is switched between the non-powering state and the powering state by pivoting the stopper shaft 53.

Configuration of the Oscillating Mechanism

As shown in FIG. 2, the oscillating mechanism 6 has a threaded shaft 21 disposed approximately directly beneath and parallel to the spool shaft 15, a slider 22 that reciprocates along the threaded shaft 21, and an intermediate gear 23 fixed to the front tip of the threaded shaft 21. The slider 22 is movably supported on two guide shafts 24 that are disposed in parallel with the threaded shaft 21. A rear tip of the spool shaft 15 is non-rotatably fixed to the slider 22. The intermediate gear 23 engages with the pinion gear 12 via a braking mechanism (not shown in the figures).

Configuration of the Spool

As shown in FIG. 2, the spool 4 is a shallow channel type spool, and is disposed between the first rotor arm 31 and the second rotor arm 32 of the rotor 3. Spool 4 is connected to the front tip of the spool shaft 15 via a drag mechanism 60. Spool 4 has a spooling drum 4a around which fishing line is wound, a skirt 4b that is integrally formed with a rear portion of the line winding body 4a, and a flange 4c that is provided on the front edge of spooling drum 4a.

Spooling drum 4a is an approximately double cylindrical member that has a boss in the center thereof, and the outer circumferential surface of the outside cylindrical portion is formed parallel with the spool shaft 15. As shown in FIG. 4, the spooling drum 4a is rotatably mounted on the spool shaft 15 by means of two bearings 56 and 57, which are mounted on the boss. The skirt 4b is a cylindrical member having a bottom, and extends outward from the rear edge of spooling drum 4a in the radial direction, and then extends toward the rear. Flange 4c has an ascending portion 4d that is integrally formed with the forward edge of the spooling drum 4a and extends radially outward therefrom, and a ring 4e made from metal and a ceramic material that is detachably mounted on the ascending portion 4d. The ring 4e is fixed to the ascending portion 4d by means of a flange fixing member 4f that is screwed into the inner circumferential surface of the spooling drum 4a.

The spool 4 abuts on and is positioned by a positioning washer 54 (spool positioning means) mounted on the spool shaft 15. As clearly seen in FIG. 4, an inner peripheral bore 44a of the inertial imparting member 44 has a greater diameter than the outer diameter of the positioning washer 54.

Configuration of the Drag Mechanism

The drag mechanism 60 is mounted between the spool 4 and the spool shaft 15 The drag mechanism 60 is a device for applying drag force to the spool 4. As shown in FIG. 4, drag mechanism 60 has a knob 61 for manually adjusting the amount of drag force, and a friction portion 62 that is comprised of a plurality of disks that are pressed together toward spool 4 by means of the knob 61.

Knob 61 has a first member 63 that is provided on the spool shaft 15 and is non-rotatable but movable in the axial direction, and a second member 64 that is disposed forward of the first member 63 in the axial direction and threaded onto the spool shaft 15, and a sound generating mechanism 65 that is mounted between the first member 63 and the second member 64.

The first member 63 is a cylindrical member having a brim, and includes a cylindrical portion 63a and a ring-shaped brim 63b that has a diameter that is larger than the cylindrical portion 63a. An elliptical engagement hole 66 that non-rotatably engages with the spool shaft 15 is formed in the inner circumference of the cylindrical portion 63a. The rear edge surface of the cylindrical portion 63a of the first member 63 abuts on the friction member 62. A seal plate 71 for preventing liquid from entering the friction member 62 from the outside is mounted between the cylindrical portion 63a of the first member 63 and the inner circumferential surface of the inner cylindrical portion of spooling drum 4a. The seal plate 71 is, for example, a seal member that is a plate-shaped elastic member made of NBR and obtained by outsert forming around the circumference of a stainless steel ring member. The seal plate 71 has a lip on the outer circumference thereof. Seal plate 71 is urged frontward by a snap ring. A ring-shaped protruding portion 71c is formed on the front surface. This protruding portion 71c abuts on a cover member 68 (discussed below) and prevents liquid from entering the inner circumference thereof.

The second member 64 faces the first member 63, and is arranged such that it is rotatable relative to the first member 63. The second member 64 has a knob unit 67 that is disposed generally forward of the first member 63 in the spool shaft 15 direction, and the cover member 68 in which the front end thereof is fixed to the outer circumference of the knob unit 67. The cover member 68 houses the first member 63 therein so as to be relatively rotatable.

The knob unit 67 is an arcuate member, and has an approximately trapezoidal knob 67a that projects frontward from the front surface is formed thereon. A nut 69 that screws onto the front tip of the spool shaft 15 is mounted inside the knob unit 67. The nut 69 is non-rotatable and movable in the axial direction. Further, a coil spring 70 is disposed in the compressed state on the outer circumference of the spool shaft 15 in between the second member 64 and the nut 69.

The cover member 68 is a member having a stepped bottom. The cylindrical portion 63a of the first member 63 passes through the bottom portion of the cover member 68. Further, the protruding portion 71c of the seal plate 71 abuts on the bottom portion of the cover member 68. A cylindrical portion 68a of the cover member 68 is screwed onto an outer circumferential surface of the knob unit 67.

An O-ring 73 is mounted in between the front tip of the cylindrical portion 68a of the cover member 68 and the knob unit 67. The O-ring 73 is an elastic member made from, for example, NBR, and is provided in order to prevent liquid from entering the interior from the gap between the first member 63 and the knob unit 67 of the second member 64. When liquid enters the interior from this gap, the liquid may enter the friction portion 62 through the gap between the first member 63 and the spool shaft 15, wet the friction portion 62, and alter the drag force.

The friction portion 62 has a disk 91 that contacts with the first member 63, and a drag sound generating mechanism 93 that is provided on the disk 91. The disk 91 has an inner disk 91a, a cylindrical portion 91b that extends rearward from the outer circumference of the inner disk 91a, and an outer disk 91c that extends outward in the radial direction from the rear end of the cylindrical portion 91b. The inner disk 91a is engaged with the spool shaft 15, and is non-rotatable with respect to the spool shaft 15. Further, the drag sound generating mechanism 93 is mounted on the outer disk 91c, and the spool 4 is in contact therewith via a drag disk 92 that is made of graphite. The drag sound generating mechanism 93 generates a sound when the spool shaft 15 and the spool 4 are rotated relative to each other, in other words, when the drag is operated.

Operation and Movement of the Reel

In this spinning reel, when the line is to be casted out, the bail arm 40 is pushed over into the line casting position. As a result, the fishing line is drawn out from the front end of the spool due to the weight of a lure.

When the line is retrieved, the bail arm 40 is returned to the line retrieve position. This automatically occurs when the handle assembly 1 is rotated in the line winding direction by operation of a bail flipping mechanism not shown in the figures. The rotational force of the handle assembly 1 is transmitted to the pinion gear 12 via the master gear shaft 10 and the master gear 11. The rotational force transmitted to the pinion gear 12 is transmitted to the rotor 3 from front portion 12a, and to the oscillating mechanism 6 via the intermediate gear 23, which is engaged with the pinion gear 12 via the braking mechanism. As a result, the rotor 3 rotates in the line winding direction, and the spool 4 reciprocates front and rear. At this time, because the inertia-imparting ring 44 is mounted on the anterior wall 41 of the rotor 3, the moment of inertia increases, the rotation of the rotor 3 becomes smooth, and the rotational feel improves even though the rotor 3 was designed to be light.

During fishing, there are times when waves and the like strike and wet the reel. In these situations, because the seal plate 71 and the O-ring 73 are mounted on the drag mechanism 60, it is difficult for water to enter into the friction member 62 from the front or rear portions thereof. For this reason, once the drag force is adjusted, fluctuations in the drag force due to wetting are unlikely to occur.

In addition, liquid can be prevented from entering the interior of the mechanism mounting space because the watershielding seal 81 is provided between the lid member 2d and the reel body 2a. For this reason, it will be difficult for seawater and the like to enter into the interior thereof, and will be difficult for salt crystals to form on the gears, guides portions, or inside the bearings.

Other Embodiments (a) In the aforementioned embodiment, an example of a front drag type spinning reel was described. However, the present invention can be applied to a rear drag type spinning reel, a spinning reel with no drag, or a lever drag type spinning reel.

(b) In the aforementioned embodiment, the inertia-imparting member 44 is mounted on the anterior wall 41 of the rotor 3. However, it may be mounted on the outer or inner circumferential surface of the cylindrical portion 30, or on any portion of the rotor 3. However, taking the rotational balance of the rotor 3 into consideration, it is preferable that the inertia-imparting member 44 be disposed around the center of the rotor unit 8.

(c) In the aforementioned embodiment, the inertia-imparting member 44 was depicted as a ring-shaped inertia-imparting ring. However, the inertia-imparting member may be of any shape as long as it can provide rotational balance. The inertia-imparting member may be divided into parts instead of being integrated to one piece. In the case the inertia-imparting member is divided into pieces, it may, for example, be divided into 8 pieces or the like, each being detachable so that the force of inertia can be adjusted.

(d) In the aforementioned embodiment, a weight for correcting rotational balance is not disclosed. However, the weight for correcting rotational balance may be disposed on at least the cylindrical portion, the first or second rotor arms, or the bail arm. In this case, it is preferable that the weight be made of sintered tungsten.

Figure 6:
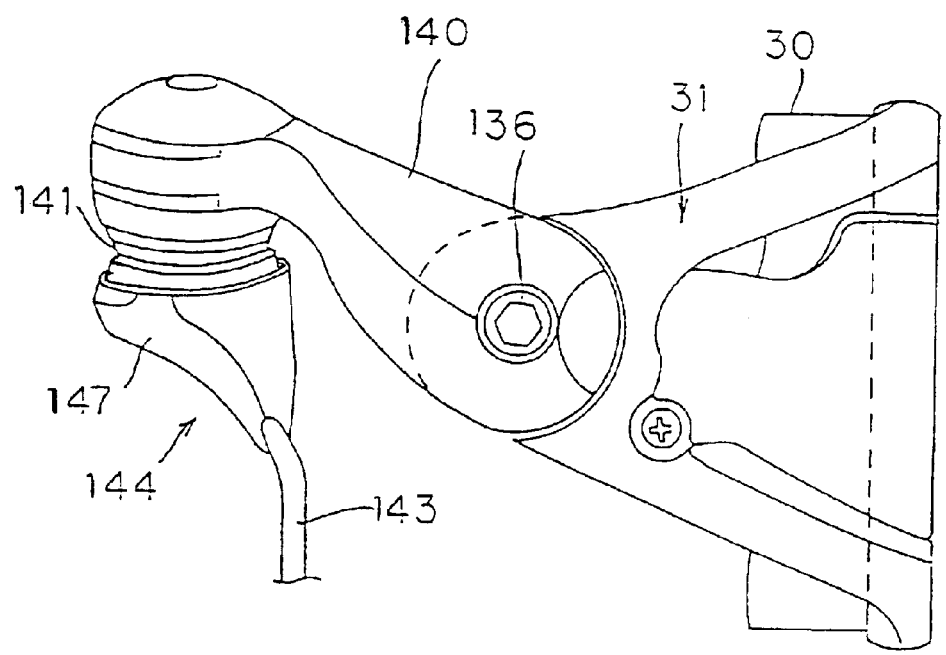
FIG. 6 is a plan view of first rotor arm.

As shown in FIG. 6, a first bail-support member 140, which is a constituent of the bail arm 144, is pivotably mounted on the outer circumferential surface of the tip of the first rotor arm 131. The first bail-support member 140 is attached to the first rotor arm 131 by means of an attachment pin 136, which is screwed into the first rotor arm 131. The attachment pin 136 is an Allen screw, which means that fishing line is not likely to get caught on the head of the screw. A line roller 141 for guiding fishing line onto the spool 4, and a stationary shaft cover 147 that is fixed to the first bail-support member 140 and sandwiches line roller 141, are mounted to the tip of the first bail-support member 140. Line roller 141 is rotatably mounted to the tip of the first bail-support member 140. The stationary shaft cover 47 is shaped as a deformed cone with a pointed tip.

Figure 7:
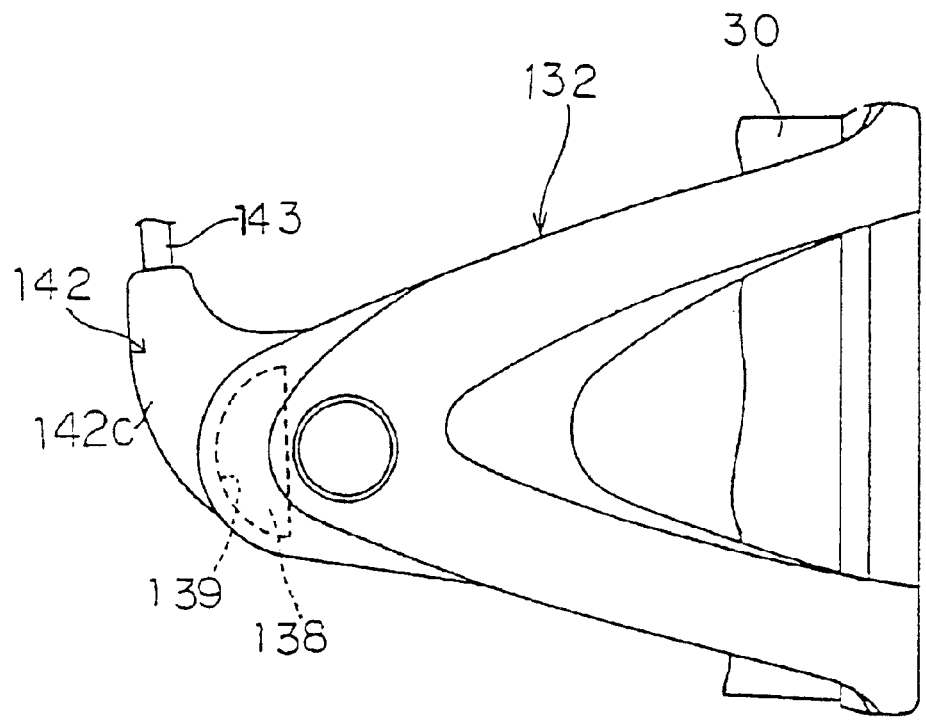
FIG. 7 is a plan view of second rotor arm.

As shown in FIGS. 6–7, the second bail-support member 142 that forms bail arm 144 is pivotably mounted on the inner circumference of the tip of the second rotor arm 132. Here, both bail-support members 140, 142 are pivotable about one pivot axis M. Then, assuming that a point at which pivot axis M intersects the first bail-support member attachment surface of the first rotor arm 131 is a pivot center C1, and a point at which pivot axis M intersects the second bail support member attachment surface of the second rotor arm 132 is a pivot center C2, then pivot center C2 is positioned at a point forward relative to pivot center C1. That is, pivot axis M is not orthogonal with respect to the rotational center axis X, but rather is inclined rearward at an angle of, for example, 5 degrees. Further, each bail support member 140, 142 is disposed so that its pivoting surface is orthogonal to the pivot axis M.

Figure 8:
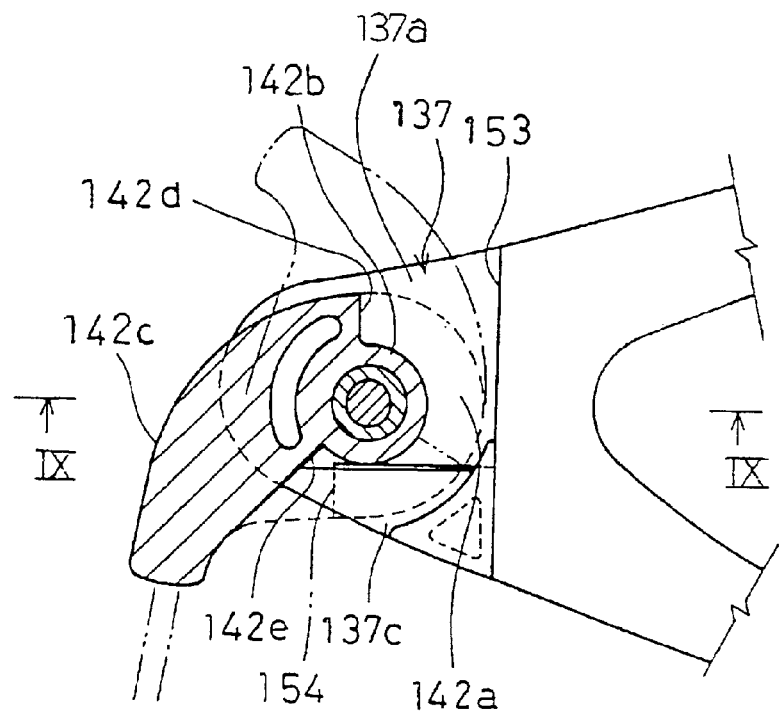
FIG. 8 is a partially plan, partially cross-sectional view of second bail-support member mounting portion.
Figure 9:
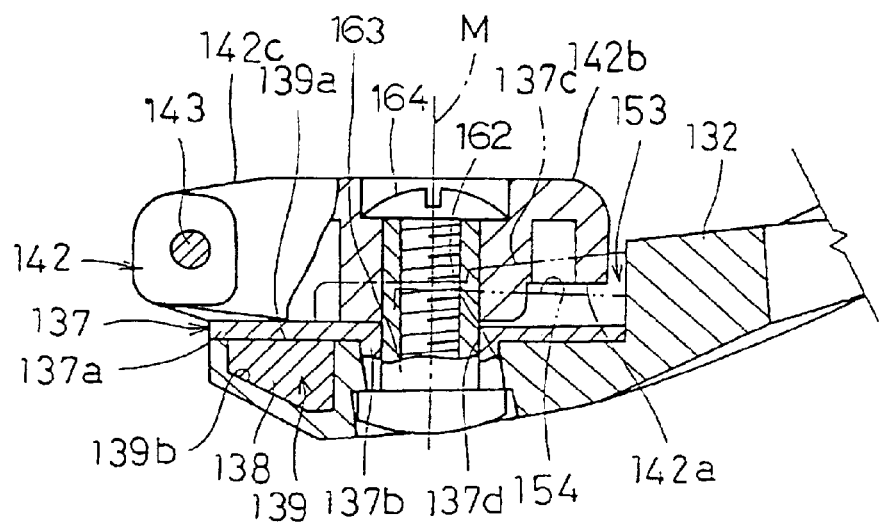
FIG. 9 is a cross-sectional view taken along line VIII—VIII of FIG. 8.

As shown in FIGS. 8 and 9, a stepped portion 153 that serves as a mount for the second bail-support member 142 is formed along the tip-end inner periphery of the second rotor arm 132, which is thinner than the rest of the second rotor arm 132. A protruding portion 154, tabular in plan view, and thicker than the rest of the stepped portion 153, is formed on the FIG. 8 lower end of the stepped portion 153. Further, a through-hole 162 for mounting the second bail support member 142 is formed in the stepped portion 153. To facilitate machining, the through-hole 162 is formed orthogonal to the rotational center axis. A mounting seat 137 made of a synthetic resin is interposed between the stepped portion 153 and the second bail-support member 142. The mounting seat 137 is interposed therebetween in order to incline pivot axis M five degrees with respect to the rotational center axis. The mounting seat 137 has a seat portion 137a of the same planar form as the stepped portion 153, a boss 137b that is mounted in the through-hole 162, and a projecting portion 137c that covers the protruding portion 154. A mounting hole 137d is formed in the boss 137b mounted in the through-hole 162. The mounting hole 137 is inclined five degrees with respect to the through-hole 162, and thus the pivot axis M is inclined five degrees with respect to the rotational center axis. A mounting nut 163 with a brim is inserted into the mounting hole 137d from the outer side, and a mounting bolt 164 is screwed into the mounting nut 163. Thus, the second bail-support member 142 is pivotably mounted on the second rotor arm 132.

As shown in FIGS. 7 and 9, a weight 138 is accommodated forward of the pivot center of the second rotor arm 132. The weight 138 is, for example, made of sintered titanium, and is mounted therein in order to correct imbalance in the rotational balance caused by skewing of the center of gravity of bail arm 144 on the first rotor arm 131. By making the weight 138 out of sintered titanium, it is less expensive compared to when simply tungsten is used. Sintered titanium is both less expensive and more easily obtainable than other heavy metals such as bismuth or molybdenum. Further, tungsten is relatively unlikely to corrode, and not likely to dissolve in seawater. For this reason, the rotational balance can be inexpensively and precisely corrected. Moreover, because tungsten has a specific gravity of 19.3, which is comparatively larger than that of lead (11.34), a weight can be smaller than a weight of the same mass made of lead, which makes the volume of the weight-housing portion 139 smaller.

The weight-housing portion 139 housing the weight 138 has a hole 139a formed opposing the mounting seat 137, and an accommodating space 139b that is formed communicating with the hole 139a. Thus, by shutting the weight-housing portion 139 with the mounting seat 137, it is no longer necessary to provide a separate closing member. This simple configuration prevents the weight 138 from falling out.

As shown in FIGS. 7 to 9, the second bail-support member 142 is a teardrop shaped component that has a curved tip, and a disk shaped base 142b that is entirely covered by the second rotor arm 132, and an exposed portion 142c that extends out from the disk shaped base 142b forward in the spool axial direction. Part of the exposed portion 142c is located on the side of the bail 142 opposite the pivot axis M. Further, the exposed portion 142c is formed such that its outer surface does not protrude outward in a direction from the inner side of the tip toward the tip of the second rotor arm 132, which is disposed on the outer side. Thus, the outer surface of the exposed portion 142c is contoured with a smooth face that has no protrusion. In this way, since the outer surface of the exposed portion 142c of the second bail-support member 142 does not protrude toward the distal end, fishing line is not likely to get caught on the distal end. For this reason, fishing line travels easily over a bail 143 to the first bail-support member 140 side without becoming snagged on the second bail-support member 142. Further, the fact that the entire disk-shaped base portion 142b is covered by the second rotor arm 132 means that fishing line is even less likely to get snagged. Moreover, since a part of the exposed portion 142c is located on the counter bail 143 side, loss of rotational balance originating in the bail 143 can be easily adjusted.

On the outer surface of the disk shaped base portion 142b of the second bail-support member 142, a cut-away portion 142a is formed at the rear. The cut-away portion 142a is shown in the area indicated by the dotted lines in FIGS. 8 and 9 ranging approximately 225 degrees, and is thinner than the remaining area indicated by hatching. The cut-away portion 142a is formed at a depth that opens a slight gap between it and the protruding portion 154 formed in the stepped portion 153. Two rests 142d, 142e are formed at either end of the cut away portion 142a. The rest 142d contacts the wall surface of the protruding portion 154 on the stepped portion 153 when the second bail-support member 142 is pivoted to the line-release posture indicated in phantom in FIG. 8. This consequently locates the second bail-support member 142 into the line-release posture. The rest 142e contacts the end of the projecting portion 137c of the mounting seat 137 when the second bail-support member 142 is disposed in the line-retrieve posture indicated by solid lines in FIG. 8. This consequently locates the second bail-support member 142 into the line-retrieve posture.

Thus constructing the rotor 3, because the outer surface of the second bail-support member 142 is formed with a smooth surface and has no projecting portions, fishing line is not apt to snag on the second bail-support member 142, and fishing line travels easily from the second bail support member 142 across the bail 143 to the first bail-support member 140.

Moreover, because the weight 138 is made of sintered tungsten and mounted onto the second rotor arm 132, rotational balance is maintained inexpensively and precisely. Further, because the hole 139a in the weight-housing portion 139 that receives the weight 138 is closed by the mounting seat 137, a special closing component is not necessary, thus simplifying the construction of the weight-housing portion 139.

The bail 143 that is a wire rod curved into an approximate U-shape is fixed between the tip of stationary shaft cover 147 and the second bail-support member 142. The bail arm 144 that guides fishing line onto the spool 4 is structured by the first and second bail-support members 140, 142, the line roller 141, the bail 143, and the stationary shaft cover 147.

Figure 10:
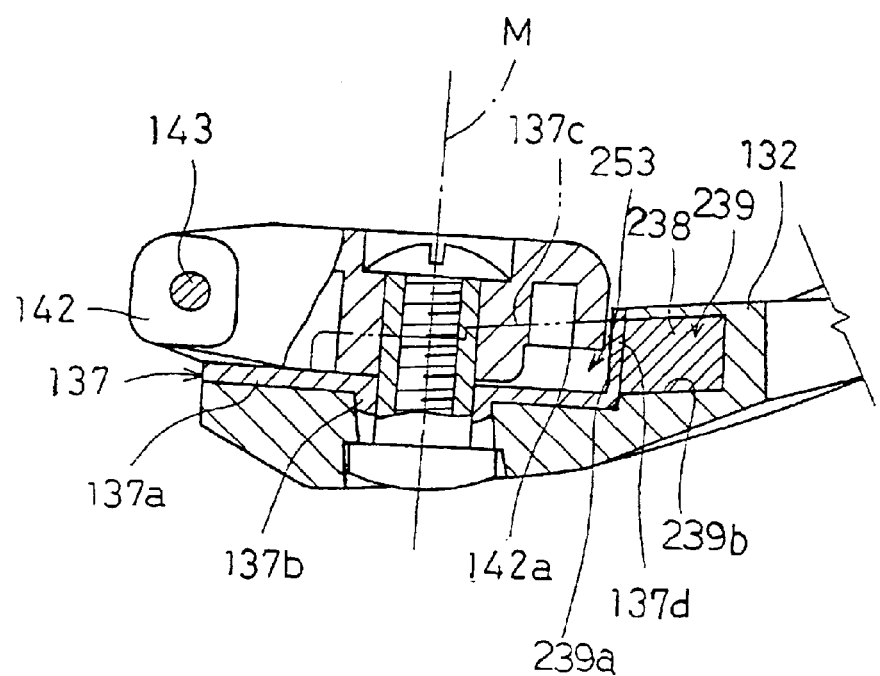
FIG. 10 is a view corresponding to FIG. 9, of another embodiment.

(e) In the aforementioned embodiment (d), the weight-housing portion 139 is provided in the tip of the second rotor arm 132. However, as shown in FIG. 10, the weight-housing portion 239 may also be provided in the base end of the stepped portion 253 of the second rotor arm 132. In this case, by providing the bail flipping mechanism in the first bail-support member 140 and making the base end of the rotor arm 131 heavier, the source of rotational imbalance is easily corrected. In this embodiment, the mounting seat 137 has a raised portion 137d that is bent into a 90 degree angle along the wall surface of the stepped portion 253, and at least a part of the hole 239a is closed by the raised portion 137d of the mounting seat 137.

Herein the same effects may be obtained by not shutting off the hole 239a entirely, but by partially shutting off enough of the hole 239a to prevent the weight 238 from falling out. Further, the weight-housing portion 239 may be provided anywhere in the second rotor arm 132, if it is positioned such that it is opposite the second bail-support member 142.

Figure 11:
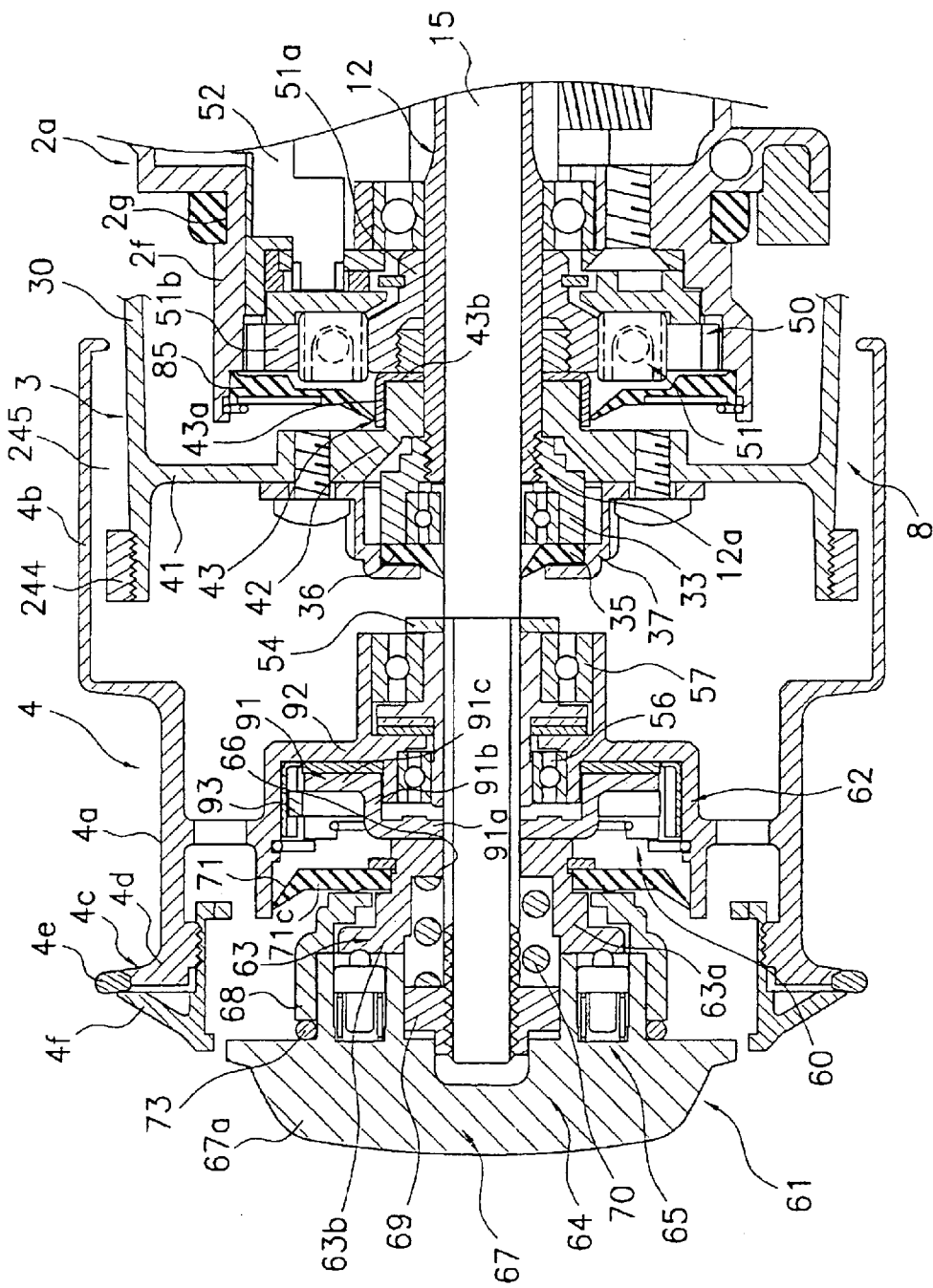
FIG. 11 is a view corresponding to FIG. 4, of still another embodiment.

(f) As seen in FIG. 11, the inertia-imparting member 244 can be disposed on the cylindrical portion 30 so as to close the gap 245, such that the fishing line is prevented from entering the gap 245 between the cylindrical portion 30 and the skirt portion 4b. In this case, by making the gap 245 between the spool 3 and the rotor 4 small by means of the inertia-imparting member 244, fishing line can be prevented from entering into the gap 245 between the cylindrical portion 30 and the spool 4, and fishing line is not easily wound around the spool shaft 15.

According to the present invention, because the inertia-imparting member is detachable with respect to the rotor unit, it can be mounted when the rotational feel is a priority, and can be removed when powering efficiency is a priority. For this reason, it can be used in both of the aforementioned situations even if the rotor was designed to be light.

What is claimed is:

1. A spinning reel rotor rotatably mounted on a reel unit for winding a fishing line onto a spool, said spinning reel rotor comprising:

a rotor unit having a cylindrical portion and first and second arms, said cylindrical portion being non-rotatably coupled to a pinion gear with a nut, said pinion gear being rotatably mounted on the reel unit, said first and second arms extending forward from a rear edge of said cylindrical portion;

a bail arm that is pivotably mounted on distal tips of both of said arms and guides the fishing line onto the spool;

an inertia-imparting member that is a ring member detachably mounted on said rotor unit with a screw such that there is a radial gap between said inertia-imparting member and said nut and said inertia-imparting member can be detached from and attached to said rotor unit by disengaging said screw when the spool is disengaged from said rotor; and spool positioning means for positioning the spool relative to said rotor unit, said inertia-imparting member having an inner bore whose diameter is greater than an outer diameter of said spool positioning means.

2. A spinning reel rotor as set forth in claim 1, wherein said inertia-imparting member is detachably mounted on said cylindrical portion of said rotor unit.

3. A spinning reel rotor as set forth in claim 2, wherein said cylindrical portion has an anterior wall that is rotatably mounted on the reel unit, and said inertia-imparting member is disposed on said anterior wall, coaxially around a center of said cylindrical portion.

4. A spinning reel rotor as set forth in claim 1, wherein said inertia-imparting member is formed from a material that has a specific gravity greater than that of the rotor unit.

5. A spinning reel rotor rotatably mounted on a reel unit for winding a fishing line onto a spool, said spinning reel rotor comprising a rotor unit having a cylindrical portion that is rotatably mounted on the reel unit, and first and second arms that extend forward from a rear edge of said cylindrical portion;

a bail arm that is pivotably mounted on distal tips of both of said arms and guides the fishing line onto the spool;

an inertia-imparting member that is a ring member detachably mounted on said rotor unit with a screw such that said inertia-imparting member can be detached from and attached to said rotor unit by disengaging said screw when the spool is disengaged from said rotor; and a weight made of sintered tungsten for correcting rotational balance, said weight being disposed on at least one of said first and second rotor arms.

6. A spinning reel rotor as set forth in claim 5, wherein said second rotor arm has a stepped portion on which a bail support member is mounted, and a mounting seat interposed between said stepped portion and the bail support member, and said weight is disposed within said second arm in between said stepped portion and said mounting seat.

7. A spinning reel rotor rotatably mounted on a reel unit for winding a fishing line onto a spool, said spinning reel rotor comprising:

a rotor unit having a cylindrical portion that is rotatably mounted on the reel unit, and first and second arms that extend forward from a rear edge of said cylindrical portion;

a bail arm that is pivotably mounted on distal tips of both of said arms and guides the fishing line onto the spool; and an inertia-imparting member that is a ring member detachably mounted on said rotor unit with a screw such that said inertia-imparting member can be detached from and attached to said rotor unit by disengaging said screw when the spool is disengaged from said rotor, said cylindrical portion and a skirt portion of the spool defining a gap therebetween, and said inertia-imparting member being disposed so as to close the gap between said cylindrical portion and the skirt portion, such that the fishing line does not enter the gap.

8. A spinning reel to be mounted on a fishing rod, comprising:

a reel unit to be mounted on the fishing rod;

a handle assembly rotatably mounted on said reel unit;

a spool;

a spinning rotor rotatably mounted on said reel unit for winding a fishing line onto said spool, said spinning reel rotor having a rotor unit having a cylindrical portion and first and second arms, said cylindrical portion being non-rotatably coupled to a pinion gear with a nut, said pinion gear being rotatably mounted on said reel unit, said first and second arms extending forward from a rear edge of said cylindrical portion;

a bail arm that is pivotably mounted on distal tips of both of said arms and guides the fishing line onto said spool;

an inertia-imparting member that is a ring member detachably mounted on said rotor unit with a screw such that there is a radial gap between said inertia-imparting member and said nut and said inertia-imparting member can be detached from and attached to said rotor unit by merely disengaging said screw when said spool is disengaged from said rotor; and spool positioning means for positioning said spool relative to said rotor unit, said inertia-imparting member having an inner bore whose diameter is greater than an outer diameter of said spool positioning means.

9. A spinning reel as set forth in claim 8, wherein said inertia-imparting member is detachably mounted on said cylindrical portion of said rotor unit.

10. A spinning reel as set forth in claim 9, wherein said cylindrical portion has an anterior wall that is rotatably mounted on said reel unit, and said inertia-imparting member is disposed on said anterior wall, coaxially around a center of said cylindrical portion.

11. A spinning reel as set forth in claim 8, wherein said inertia-imparting member is formed from a material that has a specific gravity greater than that of said rotor unit.

12. A spinning reel to be mounted on a fishing rod, comprising:

a reel unit to be mounted on the fishing rod;

a handle assembly rotatably mounted on said reel unit;

a spool;

a spinning rotor rotatably mounted on said reel unit for winding a fishing line onto said spool, said spinning reel rotor having a rotor unit having a cylindrical portion that is rotatably mounted on said reel unit, and first and second arms that extend forward from a rear edge of said cylindrical portion;

a bail arm that is pivotably mounted on distal tips of both of said arms and guides the fishing line onto said spool;

an inertia-imparting member that is a ring member detachably mounted on said rotor unit with a screw such that said inertia-imparting member can be detached from and attached to said rotor unit by disengaging said screw when said spool is disengaged from said rotor; and a weight made of sintered tungsten for correcting rotational balance, said weight being disposed on at least one of said first and second rotor arms.

13. A spinning reel as set forth in claim 12, wherein said first and second arms each has a bail support member that supports said bail arm, said second rotor arm has a stepped portion on which said bail support member is mounted, and a mounting seat interposed between said stepped portion and said bail support member, and said weight is disposed within said second arm in between said stepped portion and said mounting seat.

14. A spinning reel rotor to be mounted on a fishing rod, comprising:

a reel unit to be mounted on the fishing rod;

a handle assembly rotatably mounted on said reel unit;

a spool;

a spinning rotor rotatably mounted on said reel unit for winding a fishing line onto said spool, said spinning reel rotor having a rotor unit having a cylindrical portion that is rotatably mounted on said reel unit, and first and second arms that extend forward from a rear edge of said cylindrical portion;

a bail arm that is pivotably mounted on distal tips of both of said arms and guides the fishing line onto said spool; and an inertia-imparting member that is a ring member detachably mounted on said rotor unit with a screw such that said inertia-imparting member can be detached from and attached to said rotor unit by disengaging said screw when said spool is disengaged from said rotor, said spool having a tubular skirt portion disposed on an outer circumference of said cylindrical portion, said cylindrical portion and said skirt portion defining a gap therebetween, and said inertia-imparting member being disposed so as to close said gap between said cylindrical portion and said skirt portion, such that the fishing line does not enter said gap.

15. A spinning reel rotor rotatably mounted on a reel unit for winding a fishing line onto a spool by rotating around a rotational shaft, said spinning reel rotor comprising:

a rotor unit having a cylindrical portion and first and second arms, said cylindrical portion being non-rotatably coupled to a pinion gear with a nut, said pinion gear being rotatably mounted on the reel unit, said first and second arms extending forward from a rear edge of said cylindrical portion;

a bail arm that is pivotably mounted on distal tips of both of said arms and guides the fishing line onto the spool;

inertia-imparting means for imparting a moment of inertia to the rotor to prevent degradation in rotational feel, said inertia-imparting means being disposed on said rotor unit such that there is a radial gap between said inertia-imparting means and said nut; and spool positioning means for positioning the spool relative to said rotor unit, said inertia-imparting means having an inner bore whose diameter is greater than an outer diameter of said spool positioning means.

16. A spinning reel rotor as set forth in claim 15, wherein said inertia-imparting means is disposed around a center of said cylindrical portion, and detachable such that power efficiency can be maintained.

* * * * *